March 16, 1971   G. F. GORDON ET AL   3,570,211
AUTOMATIC TRAYING APPARATUS
Filed Nov. 21, 1967   9 Sheets-Sheet 1

INVENTORS
GEORGE F. GORDON
CHARLES C. AUSTIN
BY
Blair, Buckles & Cesari
ATTORNEYS

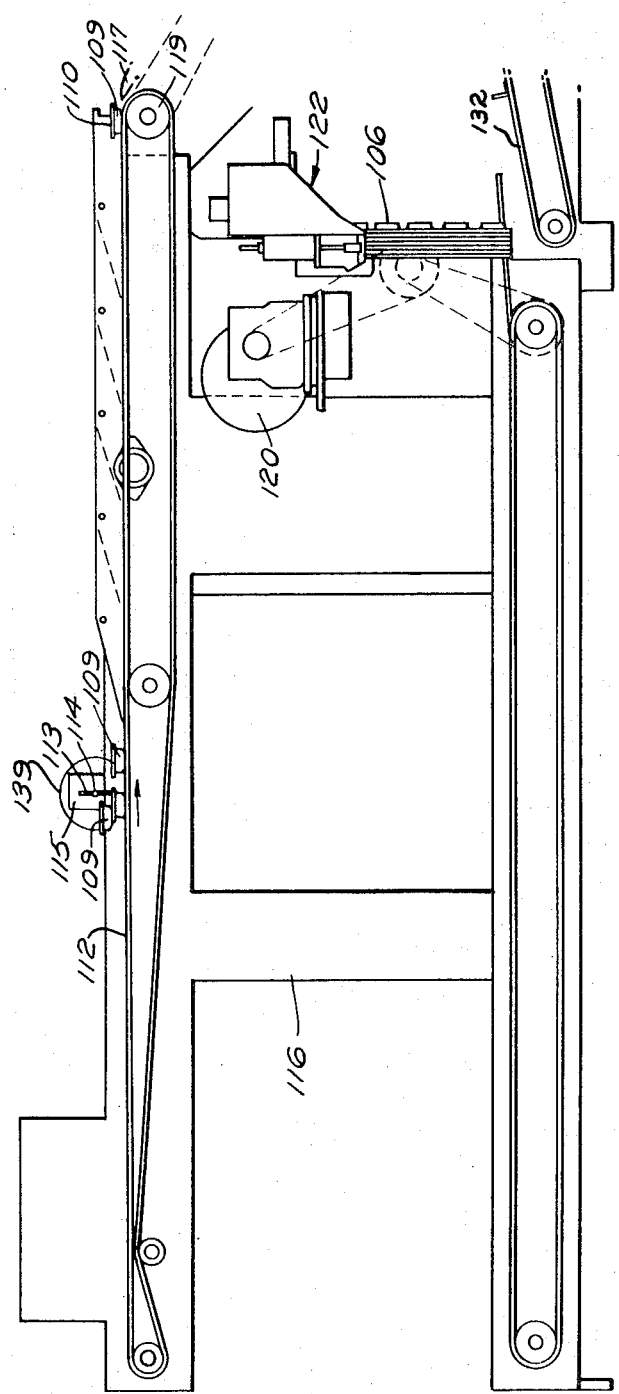

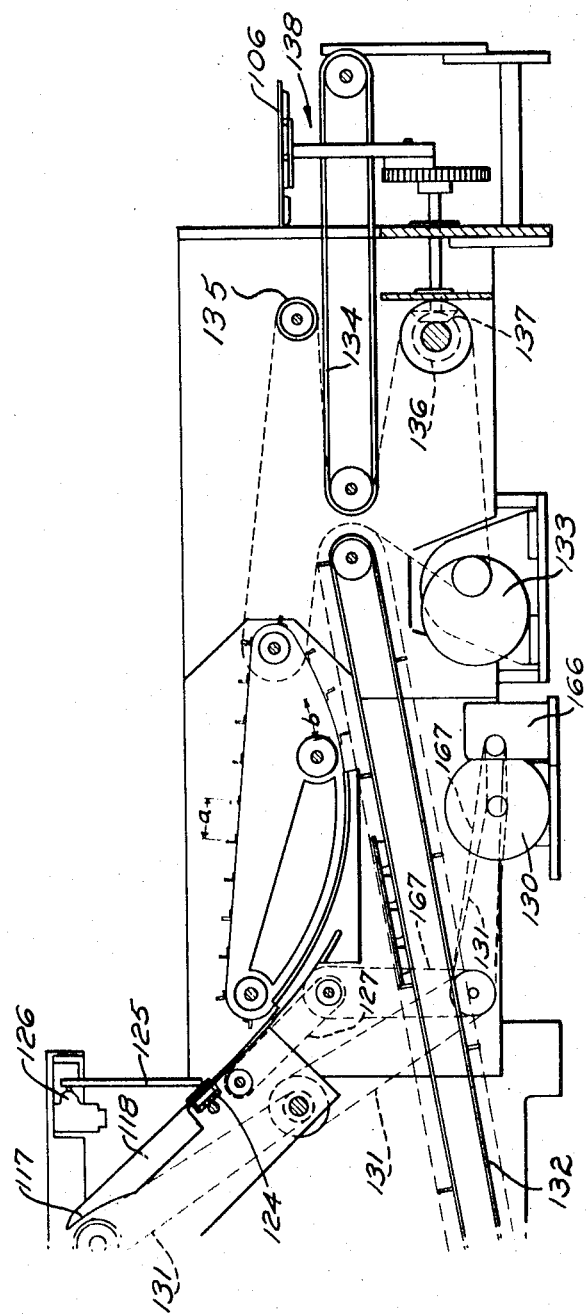

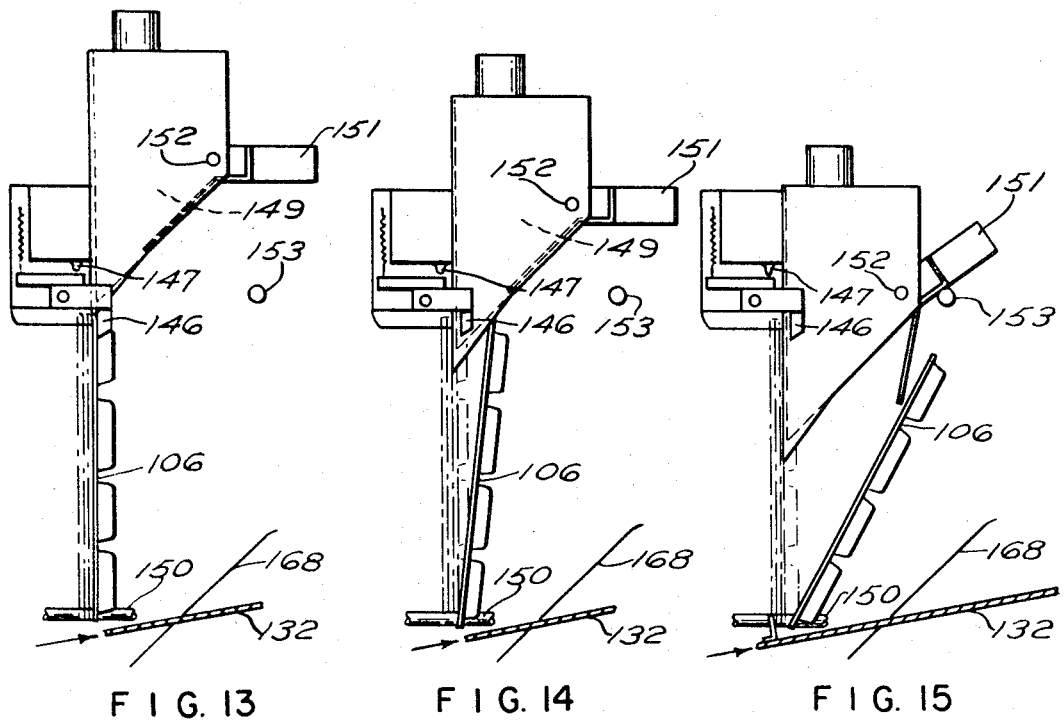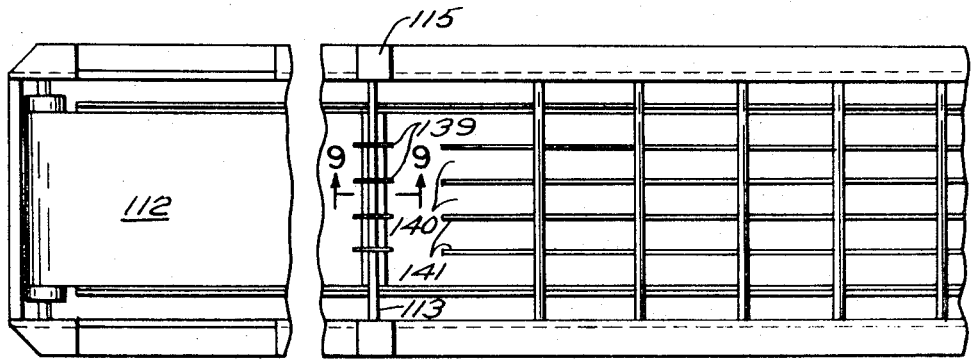

March 16, 1971 G. F. GORDON ET AL 3,570,211
AUTOMATIC TRAYING APPARATUS
Filed Nov. 21, 1967 9 Sheets-Sheet 5

INVENTORS
GEORGE F. GORDON
BY CHARLES C. AUSTIN
*Blair, Buckles & Cesari*
ATTORNEYS

INVENTORS
GEORGE F. GORDON
BY CHARLES C. AUSTIN

Blair, Buckles & Cesari
ATTORNEYS

INVENTORS
GEORGE F. GORDON
CHARLES C. AUSTIN
BY
Blair, Buckles & Cesari
ATTORNEYS

INVENTORS
GEORGE F. GORDON
CHARLES C. AUSTIN

ATTORNEYS

United States Patent Office 3,570,211
Patented Mar. 16, 1971

3,570,211
AUTOMATIC TRAYING APPARATUS
George F. Gordon and Charles C. Austin, both of Austin Gordon Design, Inc., Pine St. Extension, Nashua, N.H. 03060
Continuation-in-part of application Ser. No. 595,822, Nov. 21, 1966. This application Nov. 21, 1967, Ser. No. 684,810
Int. Cl. B65b 57/00
U.S. Cl. 53—55                                    11 Claims

ABSTRACT OF THE DISCLOSURE

An automatic traying apparatus for filling trays with containers performs the functions of (1) unscrambling a quantity of containers, (2) receiving and individually separating a compressed stack of trays to deposit trays at intervals onto a conveyor, (3) loading the containers into the trays and (4) stacking the filled trays.

---

This application is a continuation-in-part of applicants' copending application, U.S. Ser. No. 595,822, filed Nov. 21, 1966 now abandoned.

BACKGROUND OF THE INVENTION

(A) Field of the invention

The present invention relates to automatic traying apparatus. More particularly, it relates to a device for receiving a quantity of containers and a quantity of trays with pockets therein and for automatically placing the containers in the pockets.

(B) Prior art

In the past decade the market for prepackaged small quantities of condiments and specialty foods has increased tremendously. In particular, the restaurant trade consumes very large quantities of prepackaged jams, preserves, jellies, coffee cream and pancake syrup. These materials are generally packaged in small cups made of aluminum or plastic with a thin film of aluminum foil or plastic sheeting used as a cover. The cover is generally cemented on with a pressure sensitive adhesive which has sufficient tackiness to maintain a good closure during normal handling but which may be stripped off easily when the contents are to be used.

Machines for automatically filling these containers have been available. Once the containers are filled, however, they are packed manually into pressed fiber trays which facilitate handling and shipping and also serve to protect the containers during such operations. The trays generally have 20 to 25 pockets sized to fit snugly each container placed therein. When filled, the trays are stacked in groups and packaged for shipment.

The capability of container-filling machines has now reached the point where many personnel are required manually to load the filled containers in trays and package them. On the other hand, the problems of providing a machine which can automatically load into trays the filled containers at a rate equal to or greater than the filling machines are not insignificant. Conventional product handling techniques are not necessarily useful when applied to the handling of large quantities of thin-walled, frangible containers filled with liquid or jelly substances.

BRIEF DESCRIPTION OF THE INVENTION

It is, therefore, an object of the present invention to provide an apparatus for automatically loading trays at a high rate of speed with small filled containers.

Another object of the present invention is to provide an apparatus for automatically loading trays with containers and which is adjustable for trays of various sizes.

An additional object of the present invention is to provide an apparatus for filling trays with containers at speeds variable at the will of an operator.

Yet another object of the present invention is to provide an apparatus for filling trays with containers that provides maximum operator safety.

Other objects of the invention will in part be obvious and will in part appear hereinafter.

Briefly, the automatic traying apparatus of our invention includes a conveyor belt which receives a quantity of small filled containers. In one embodiment of our invention the conveyor belt comprises a broad, flat belt for carrying the containers into parallel chutes which align them into columns. In another embodiment, the conveyor belt is broken up into a number of discrete belt segments travelling in opposite directions, adjacent segments spinning the containers to position them entirely on one segment or the other and ultimately to orient them in parallel columns. A leveler bar is used to level off all containers that are stacked on top of each other and the containers are then passed through an unscrambling mechanism which rejects all containers that are upside down. The unscrambled containers are then conveyed through a feed chute in columns to a trough, or channel, transverse to the product flow. The trough is sized to receive a number of containers equivalent to the number of pockets in one row of the tray to be filled.

As a tray is advanced, the trough is automatically tipped to spill out the containers which then flow, at a controlled rate, between tracks or rails wherein they are oriented properly for loading into the tray. As the row, or flight, of containers exits from the orientation tracks they are deposited into a row of pockets on the tray. When all rows of the tray are filled, the tray is further advanced under a sponge roller which gently presses any unseated containers all the way into the pockets of the tray.

The tray is then conveyed to a stacking mechanism, which stacks each new tray in at the bottom of a stack. This enables the stacked trays to be removed from the top by an operator without danger of his hands getting caught in the stacking mechanism.

The invention accordingly comprises the features of construction, combination of elements and an arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 6 is an elevational view of an embodiment of the machine of the present invention, opened up to show the driving mechanism and product flow;

FIG. 7 is a continuation of the illustration of FIG. 6;

FIG. 8 is a plan view of the first stage of the apparatus of the present invention, which unscrambles the containers and aligns them in parallel columns;

FIG. 13 is an elevational view of the tray separating mechanism of the present invention in its initial phase of operation;

FIG. 14 is an elevational view of the apparatus illustrated in FIG. 13 in a more advanced phase of its cycle;

FIG. 15 is an elevational view of the apparatus illustrated in FIG. 13 in the last phase of its operation;

SPECIFIC DESCRIPTION OF THE INVENTION

In general

Figure 1:
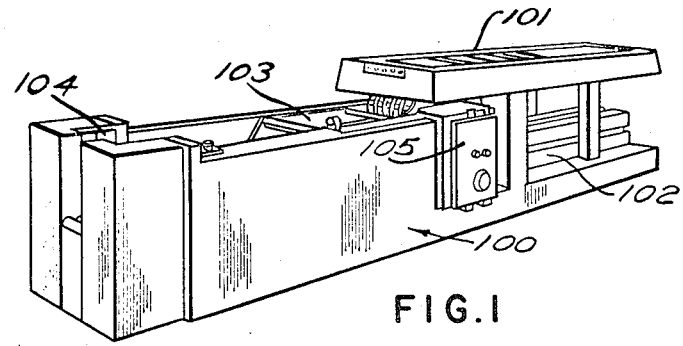
FIG. 1 is a perspective view of a typical embodiment of the machine of the present invention.

The overall machine 100 of the present invention is illustrated in FIG. 1. The unscrambling portion 101 is at the upper rear of the machine. Beneath the unscrambling portion 101 is the tray feed 102.

The container orienting and tray loading portion of the machine 103 is centrally located. The tray stacking area 104 is at the front of the machine. The power input and machine controls 105 are externally located on the side of the machine.

Figure 2:
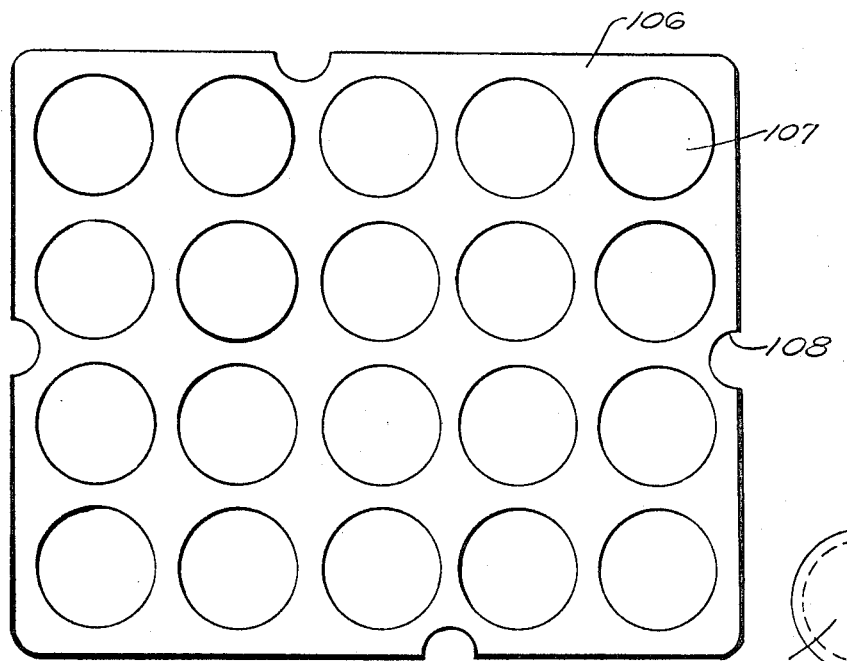
FIG. 2 is a plan view of a typical tray which is loaded automatically by the machine of the present invention.
Figure 3:
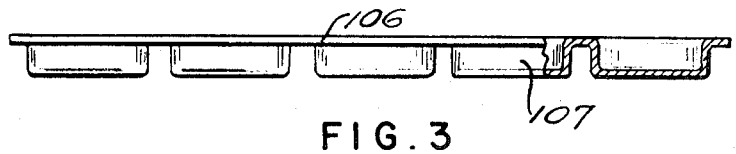
FIG. 3 is an elevation, partly in section, of the tray of FIG. 2.

FIGS. 2 and 3 illustrate a typical fiberboard tray 106 which may be used with the apparatus of the present invention. The tray 106 contains a number of pockets 107 into which the containers are loaded. When received from the manufacturer, the trays are generally nested with the pockets all in register and are highly compressed.

The trays 106 contain notches 108 which, when many trays are nested together, form a groove down the stack. Tracks, rods or rollers may be provided on the machine tray feed to ride in the grooves formed by the tray notches 108 thus tending to keep the trays 106 in proper alignment as they are fed in. The notch 108 is also useful as a point at which to sense tray thickness. Since splitting off individual trays from the stack requires an accurate determination of tray thickness, the notch 108 is the best point to determine thickness. The tray edge or lip is likely to be ragged and less uniform in thickness than the notch portion.

Figure 4:
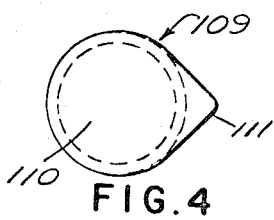
FIG. 4 is a plan view of a jelly container which may be handled by the machine of the present invention.
Figure 5:
FIG. 5 is an elevational view of the container of FIG. 4.

While the apparatus of the present invention may be adapted to handle myriad forms and shapes of containers FIGS. 4 and 5 illustrate a jelly cup 109 which is typical of the containers now widely used in the restaurant trade. The jelly cup 109 has a lid 110 with a lip portion 111. The lip portion 111 is conveniently used as a point at which to grip the cover 110 and peel it off the cup 109.

Product flow

The overall product flow of the apparatus of our invention is best understood by referring to FIGS. 6 and 7. A quantity of cups 109 are loaded onto the conveyor belt 112 as shown in FIG. 6. As the cups 109 are advanced from left to right they pass under a blade 113. The blade 113 is supported by a rod 114 that extends into a portion 115 of the machine frame 116. The disk 139 serves as a guide vane to line the cups up in columns.

The blade 113 is adjusted so that its height is greater than that of a jelly cup 109 but less than twice the height of a jelly cup 109. By so adjusting the blade 113 only a single layer of cups 109 pass under it thereby preventing stacked cups from progressing into the next stage of the machine. The blade 113 may also be adapted to rotate in a direction opposite to the direction of the belt 112, i.e. clockwise as viewed in FIG. 6.

As the cups 109 reach the end of the conveyor belt 112 they contact the leading edge 117 of a feed chute 118. The feed chute 118 is illustrated more clearly in FIG. 7.

The leading edge 117 is so positioned with respect to the end of conveyor belt 112 that when the cups 109 are upright they override the edge 117 and then slide by gravity, down the feed chute 118.

Figure 10:
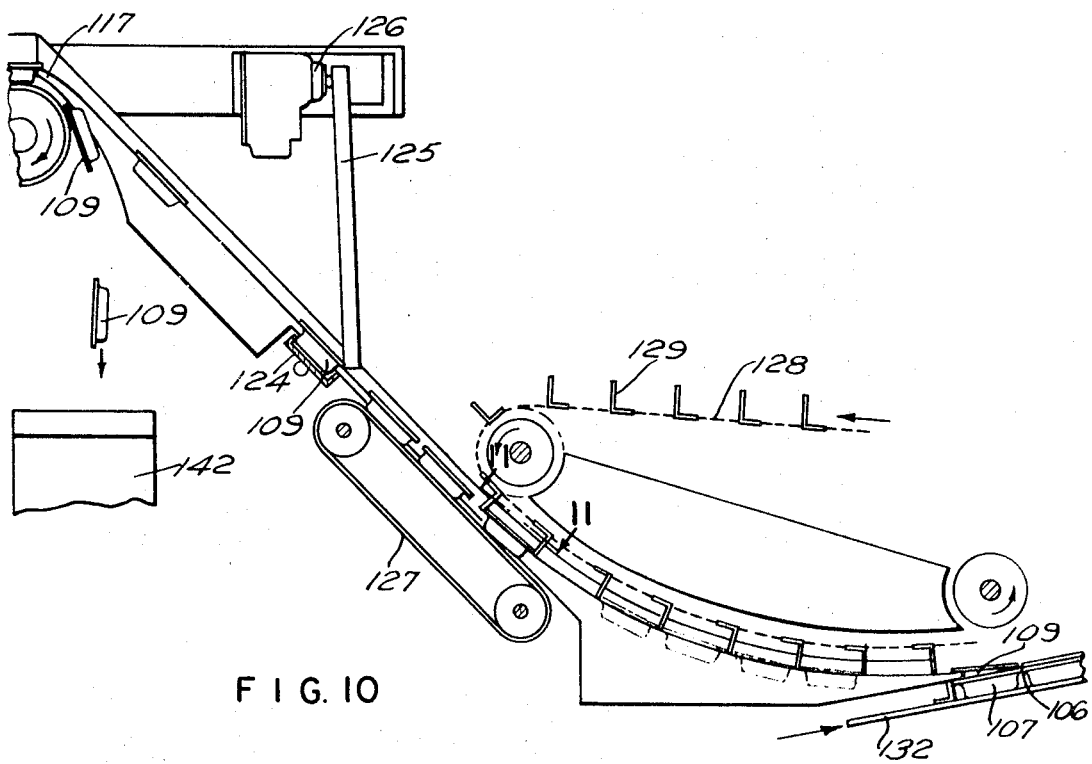
FIG. 10 is an elevation of the portion of the apparatus of the present invention illustrating the product flow from final unscrambling to loading of the trays.

If, on the other hand, a cup 109 is upside-down on the conveyor belt 112, the cover 110 will slip under the leading edge 117 and the entire cup 109 will be forced under the edge 117 and around the roller 119 into a container 142 illustrated schematically in FIG. 10.

A motor 120 drives the tray conveyor belt 121 by means of chains 123 shown as dash lines in FIG. 6.

The feed chute 118 contains a number of longitudinal channels equal to the number of pockets across the tray. These are filled from a corresponding number of columns of containers formed in the unscrambling region. In the case of tray 106, there are 5 pockets 107 which calls for 5 channels in the feed chute 118. The cups 109 travel by gravity down the various channels in the feed chute 118 and come to rest in the trough 124. A number of sensing arms 125, equal to the number of cups 109 in a full flight, determines when the trough 124 is full. When a cup 109 drops into the trough 124 the sensing arm 125 is moved and closes a switch 126. When all the switches 126 are closed, the trough 124 quickly rotates clockwise in a reciprocating manner, when viewed from the direction illustrated in FIG. 7, and dumps the flight of cups 109 onto a moving belt network 127. The belt network 127 is made up of moving O-ring belts which orient the cups 109 in a manner that will be more fully described with reference to FIGS. 10 and 11.

The cups 109 are then further advanced by means of chain 128 and tabs 129 up to the point where they are released into the advancing tray 106. At the point of release into the tray 106 the cups 109 cannot bind between the tabs 129 since the chain 128 at that point is traversing an arcuate path. This spreads the tabs 129 so that they are further opened at the point of release, position "b," than the tabs 129 are at position "a," where their path is planar.

The motor 130, by means of transmission 166 and chains 167, drives the moving belt network 127. The motor 130 directly drives the conveyor belt 112 and the rod 114 by means of the chains 131.

Another motor 133 drives the cup-loading chain 128, the tray advancing belt 132, the final tray advancing belt pair 134, the cup pressing roller 135 and the input 136 to the gear train 137 for the tray stacking mechanism 138.

The motor 133 is connected through an electrical circuit to the sensing arms 125 and switches 126. It is also connected to a switch which is closed by the advancing tray as a tray is separated from its stack. The circuit is so constructed that if no tray is being advanced on the belt 132 the trough 24 will not operate to dump cups 109 onto the belt network 127 because the motor 133, which activates the trough 124, will be turned off. Likewise, if there are no cups 109 in the trough 124, the circuit also operates to stop the motor 133 so that the trays 106 are not advanced on the belt 132. In other words, all the switches 126 and the tray activated switch (activated by the whisker 168 in FIGS. 13-15) are all connected in series and must all be closed for the motor 133 to operate.

The motor 133, therefore, is continuously switched on and off to move the trays 106 forward incrementally. The speed of the motor 133 may also be manually controlled by a rheostat thereby enabling an operator to vary the rate of tray filling.

After the trays 106 are filled, they move off the belt 132 onto the belt 134. The trays 106 then pass under a spongy cup pressing roller 135 that urges any unseated cups 109 snugly down into the tray pockets 107 without damaging them. The roller 135 and the belt 134 are driven in synchronism with the tray stacking mechanism designated generally as 138. This assures that the stack of trays 106 is always elevated when a newly filled tray 106 moves into final position at the bottom of the stack.

The unscrambler

Figure 9:
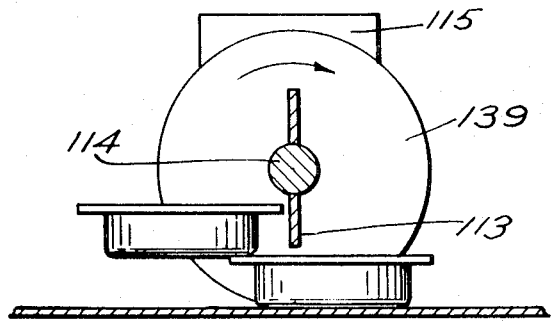
FIG. 9 is an elevation, taken along the line IX—IX, of the portion of the apparatus of FIG. 8 illustrating the element which prevents stacking of the containers.

Illustrated in FIGS. 8 and 9 are further details of the mechanism for unscrambling cups as they are loaded onto the conveyor belt 112.

As pointed out above, the cups 109 pass under the blade 113 which shears off any stacked cups 109. The disks or guidevanes 139, secured to the rod 114, line the cups 109 up into columns where they pass into the channels 140 between partitions 141.

The final phase of unscrambling is removal of the upside-down cups. The means for accomplishing this is more clearly illustrated in FIG. 10. As pointed out heretofore with respect to FIGS. 6 and 7, culling out of the upside-down cups occurs as they strike the leading edge 117 of the feed chute 118. The upside-down cups, because their lip slides under the leading edge 117, are carried around under the chute 118 between it and the roller 119. They are then dropped into a container generally indicated at 142.

The upright cups 109 slide over the leading edge 117 and down the chute 118. The chute 118 has a plurality of channels which are precisely in register with the channels 140 illustrated in FIG. 8.

The cups 109 slide down the feed chute 118 into the trough 124 where they are retained in flights to await loading into the trays 106.

As the cups 109 drop into the trough 124 the sensing arms 125 are deflected and close the microswitches 126. There is an arm 125 and microswitch 126 for each cup 109 that enters the trough. When the flight of cups is complete, all microswitches 126 are closed which enables the motor 133 to operate and advance another tray 106 to receive the next flight of cups 109. The instant a tray 106 is advanced, the trough 124 rotates clockwise in a reciprocating manner, as viewed in FIG. 10, to dump the cups 109 onto the belt network 127.

Orientation

Figure 11:
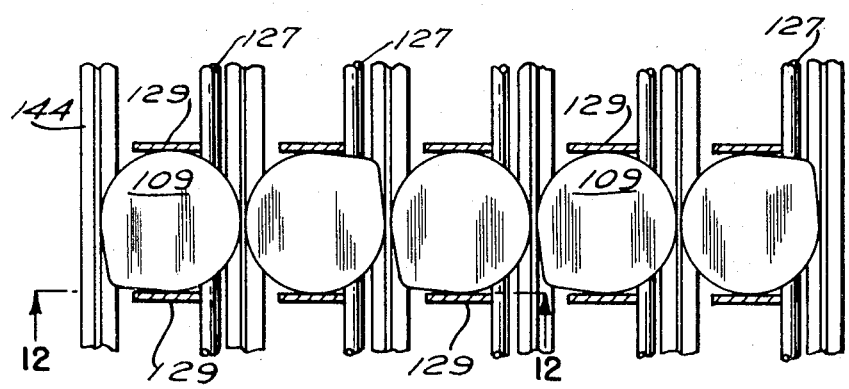
FIG. 11 is a plan view, taken along the line XI—XI in FIG. 10, of that portion of the apparatus of the present invention which gives a rotational orientation to the containers.
Figure 12:
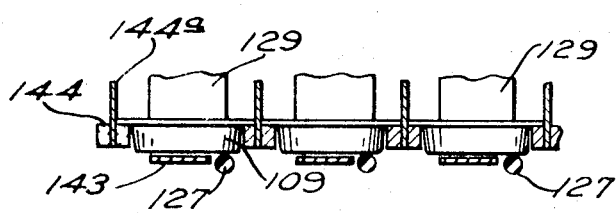
FIG. 12 is an elevation, partly in section, taken along the line XII—XII of the apparatus of FIG. 11.

As a flight of cups 109 is dumped from the trough 124 down the guide rail 144, which extend from the leading edge 117 to the point where the cups 109 are loaded into the tray 106, they are loosely secured between the tabs 129 as illustrated more clearly in FIGS. 11 and 12. In this region the cups 109 are positioned between guide rails 144 and are oriented by means of the O-ring belt 127. The O-ring belt 127 is traveling at a slightly faster rate than the gravitational speed of the cups 109. Since the O-ring belt 127 is in frictional engagement with the cups 109, it causes them to rotate in a clockwise direction until the cup lip portion 111 strikes the guide rail raised edge 144a. This causes all of the lip portions 111 to face either the lower left hand corner, as illustrated in FIG. 11, or the upper right hand corner. It gives a neat appearance when the flights are loaded into the trays to have the lips 111 so oriented, prevents the lip portion 111 of one cup 109 from interfering with the lip portion 111 of the adjacent cup 109 in the tray 106 and prevents lip portions 111 from hanging over the edge of the tray 106. Cups 109 are prevented from dropping between the guide rails 144 by the supporting members 143.

The cups 109 are then removed from the belt network 127 by the tabs 129 on the chain 128. The tabs 129 then advance the cups 109 to the point where the entire flight of cups 109 is deposited in row of pockets 107 in a tray 106. As noted above, the tray 106 meets the cups 109 at a point where the belt 128 is traversing an arc so the tabs 129 are sufficiently spread eo release the flight of cups 109 into the tray pockets 107.

Tray separation

One of the more difficult tasks performed by the apparatus of our invention is that of separating individual trays from a stack which has been nested and tightly compressed. The separation mechanism and sequence is illustrated more clearly in FIGS. 13 through 17 of the drawings. Here, a stack of trays 106 is advanced until it strikes the arm 146 on a microswitch 147. The trays remain in this position until a tray is called for because the presence of a full flight of cups 109 in the trough 124. When this condition is met, a pair of spiking blades 148 and 149 split off the end tray as they descend. The blade 148 is slightly longer than the blade 149 and leads it in spearing apart each tray 106 in the front of the stack.

In FIGS. 13 through 15 the blade 149 is obscured by the blade 148 and is shown in dashed lines. As the blades 148 and 149 spear in between the trays, the separated tray 106 is knocked off of the guide bar 150 onto the moving belt 132 by means of an angular bar or kicker 151 which pivots around a shaft 152 as the upper end of kicker 151 strikes a bar 153. The falling tray also bends the whisker 168 which closes a mercury switch enabling the motor 133 to advance the tray 106.

Figures 16, 17:
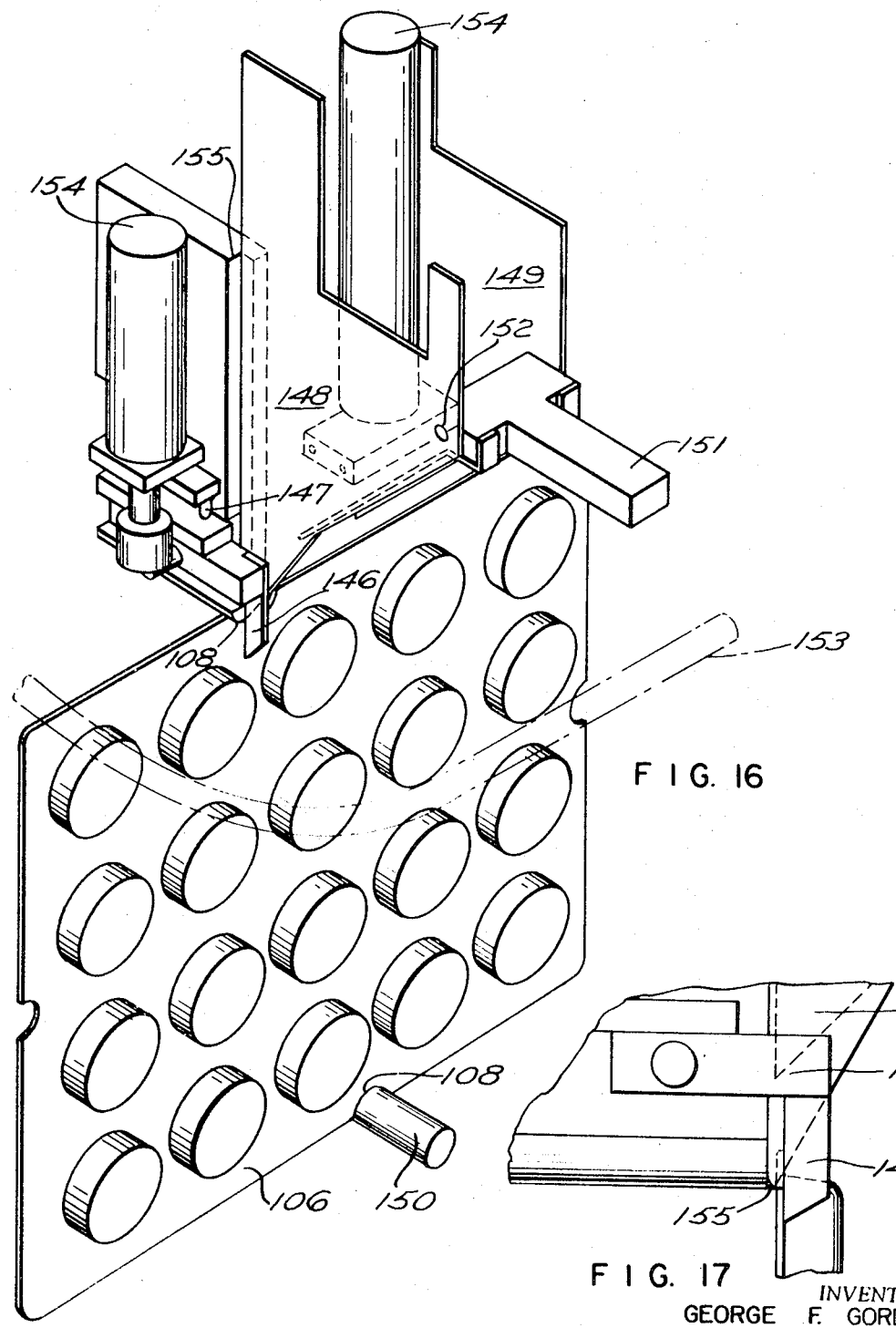
FIG. 16 is a perspective view of the apparatus illustrated in FIG. 13.
FIG. 17 is a detailed elevational view of the sensing mechanism of the apparatus illustrated in FIG. 13.

The perspective view of FIG. 17 illustrates more clearly the kicker 151 and its relation to the bar 153. Here it may be seen more clearly that the microswitch arm 146 contacts the tray 106 at a notch 108. The spiking blade 148 is also driven into the tray stack at the notch 108.

The frame which supports the spiking blades 148 and 149 consists of air cylinders 154, for pneumatically driving the spiking blades 148 and 149, and guides 155 which maintain the alignment and spacing of the blades 148 and 149.

FIG. 17 is an enlarged view of the contact arm 146. The dashed lines illustrate the positions of the points 155 and 156 of the blades 148 and 149 respectively in their dormant position. Microswitch 147 may be adjusted with respect to the blades 148 and 149 to accommodate trays of varying thicknesses.

After the trays 106 are batted down onto the conveyor 136 by the kicker 151, they are advanced and filled in the manner described above with respect to FIG. 10.

Tray stacking

Figure 19:
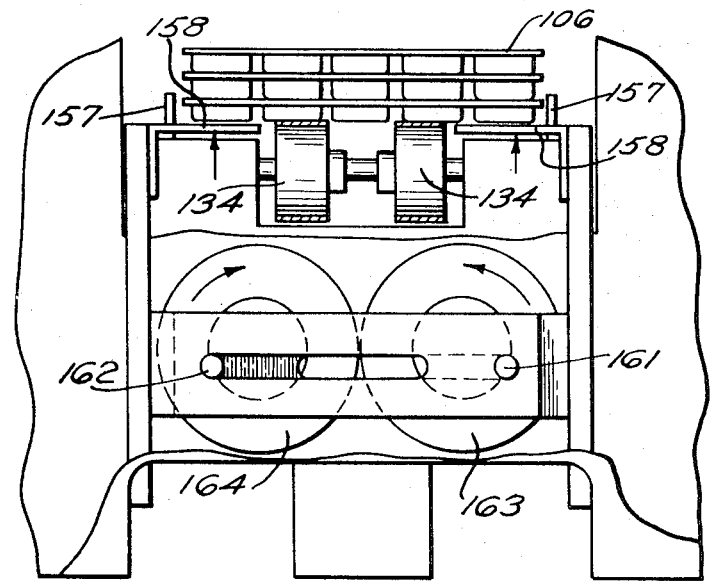
FIG. 19 is an elevational view of the apparatus of FIG. 18 in a more advanced phase of its operation.
Figure 20:
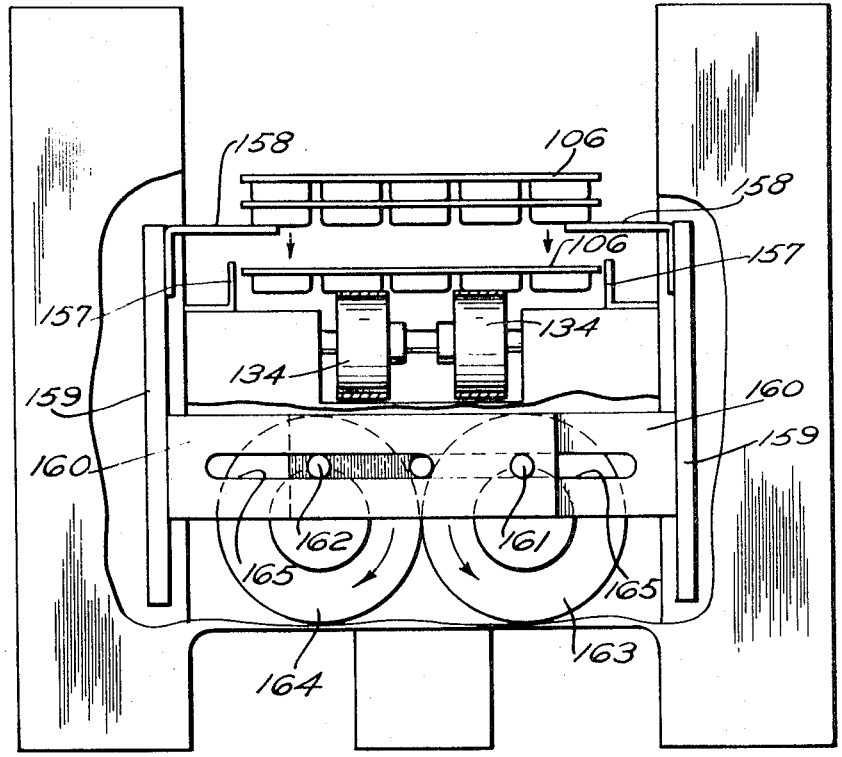
FIG. 20 is an elevational view of the apparatus illustrated in FIG. 18 in the final stage of its operation.
Figure 18:
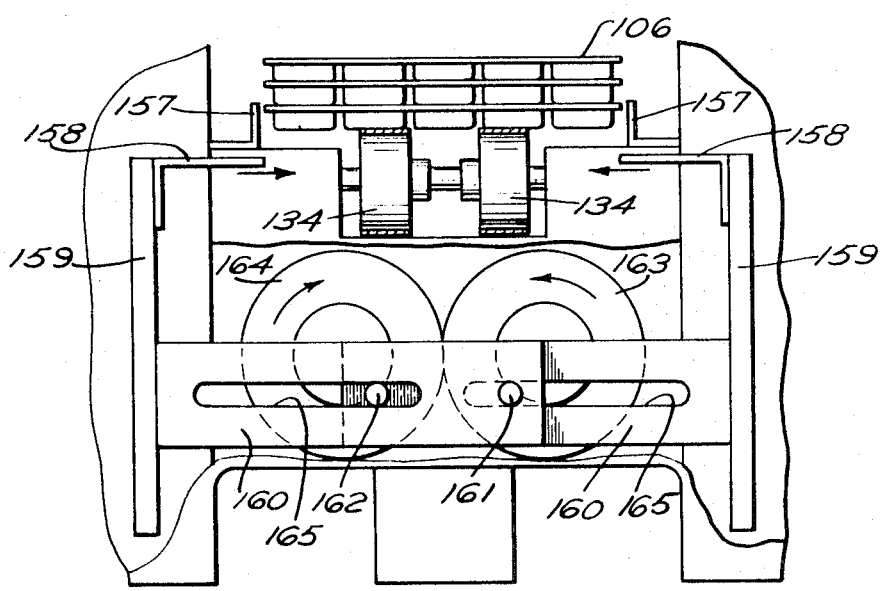
FIG. 18 is an elevational view of the tray stacking mechanism of the apparatus of the present invention in the first phase of its operation.

After the trays 106 have been completely filled and are advanced onto the conveyor belt pair 134 and under the cup pressing roller 135, they are stacked by means illustrated sequentially in FIGS. 18 through 20.

In FIG. 18 a stack of trays 106 is shown resting on a pair of belts 134. The stack of trays 106 is maintained in alignment by a pair of guide rails 157. A pair of brackets 158 is secured to the supporting members 159 which are adapted to move in a circular path in counter rotation.

Movement of the brackets 158 and supporting members 159 is controlled by the force on the plates 160 occasioned by rotation of the pins 161 and 162. The left hand member 159 and plate 160 are secured to the pin 161. The right hand supporting member 159 and plate 160 are secured to the pin 162. The pins 161 and 162 are driven in a circular path by the counter rotating gears 163 and 164 respectively.

As the gears 163 and 164 rotate the pins 161 and 162, the pins 161 and 162 shuttle back and forth in the slots 165, thus driving the plates 160, supporting members 159 and brackets 158 in counter rotation to engage and elevate the stack of trays 106 and make room at the bottom of the stack for each newly filled tray as it approaches.

This arrangement of stacking from the bottom up is highly desirable from a safety standpoint since it enables an operator to lift trays off the top of the stack without getting his hands into the stacking mechanism.

Safety aspects of the apparatus of our invention are stressed by having all moving parts housed as illustrated more clearly in FIG. 1. Sanitation is improved by using stainless steel or aluminum for most major parts, and major components may be opened up or removed for easy cleaning.

Alternative unscrambling

In packaging containers at a high rate, care must be taken to prevent backups in the unscrambling or in-feed section when aligning the containers into columns, as these backups interfere with the aligning operation and ultimately lead to clogging of the feed and rupture of the backed-up containers. In cases where this is likely to be a problem due to an increased feed rate, it may be found preferable to use a modified form of in-feed section.

Figure 21:
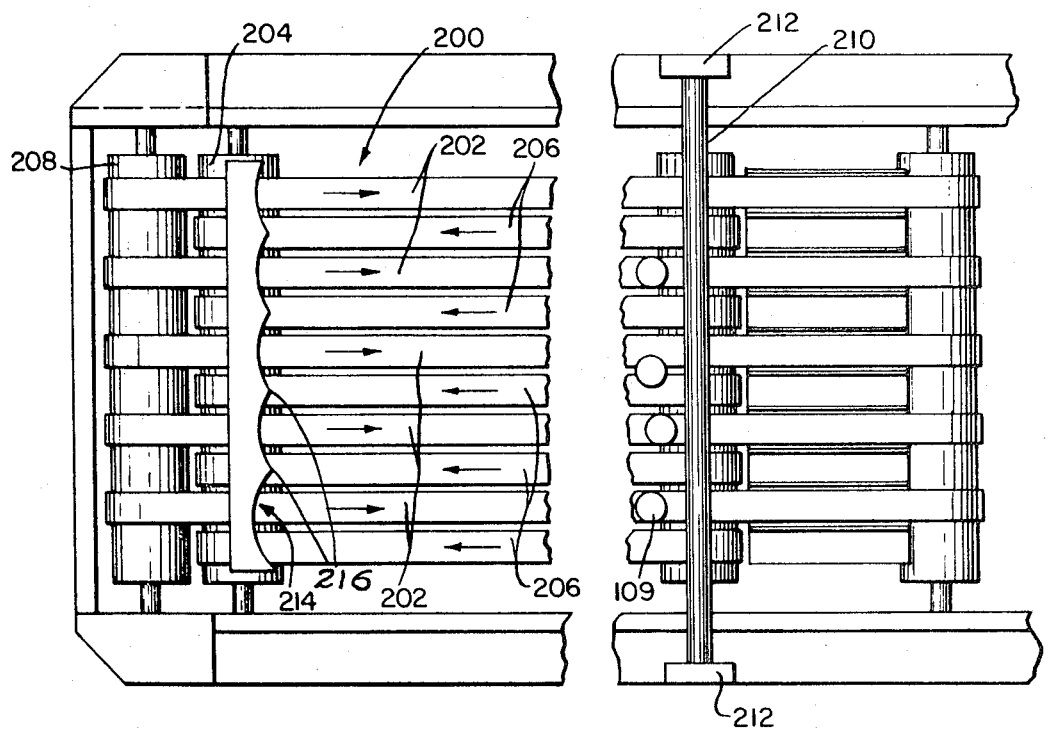
FIG. 21 is a plan view of an alternate form of conveyor belt which may be used in place of the conveyor belt of FIG. 8.
Figure 22:
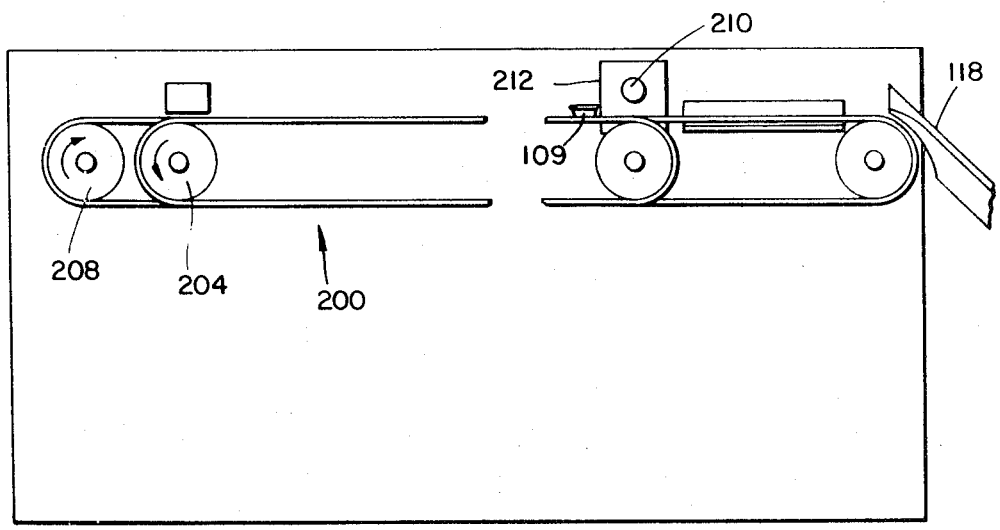
FIG. 22 is a side elevational view of the apparatus illustrated in FIG. 21.

FIGS. 21 and 22 are plan and side views respectively of an alternate form of in-feed conveyor which is especially suitable for such applications. The conveyor 200 consists of a first set of belts 202 driven by a roller 24 which drives the belts 202 to the right as seen in FIG. 21. Alternated with the belts 202 is a second set of belts 206 which are driven to the left by a roller 208. The rollers 204 and 208 are driven in counter-rotating directions by suitable driving means (not shown). The belts 202 are of a width equal to or slightly greater than the width of a container 109, while the width of the belts 206 is preferably equal to or less than that of the belts 202. A leveler bar 210 carried by a mount 212 is positioned above the conveyor belts a sufficient height to allow only a single layer of containers to pass under it. A diverter plate 214 has cusp-like fingers 216 extending to the right above the belts 206.

In operation, filled containers are deposited on the conveyor belt 200 to the right of the deflector plate 214. Some of these containers fall entirely onto the belts 202 and are carried to the right in columns with these belts. Others fall entirely onto the belts 206 are are carried to the left against the fingers 216 of the deflector plate 214. On hitting these fingers, the containers are shunted to one side or the other onto one of the belts 202 and are then carried to the right with the other containers. Finally, some containers fall partly on one of the belts 202 and partly on one of the adjacent belts 206. These containers are spun around by the oppositely-moving belts until they settle on one or the other of the belts 202 and 206 and are then processed as described above. As a result, the containers are ultimately aligned in columns on the belts 202 and are then fed to the feed chutes 118 where they are further processed in the manner previously described.

Due to the presence of a large number of adjacent, oppositely-moving belts, there is less likelihood that containers will stack on top of one another in the conveyor system shown in FIGS. 21 and 22 than is the case with respect to the conveyor system shown in FIG. 8 in which a single broad conveyor belt is utilized. However, to ensure that only a single height of containers is fed to the following portions of the traying mechanism, the leveler bar 210 is mounted above the conveyor 200 to knock off any excess layers. The bar 210 may be fixed in position as shown without injury to the containers since any temporary pile-up due to its operation will be quickly relieved by the operation of the belts 206.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An automatic traying apparatus for filling trays with containers, said apparatus comprising:
 (A) means for receiving a quantity of containers and unscrambling said containers so that only a single layer of containers may exit therefrom and comprising:
  (1) first and second sets of belt segments for receiving said containers, said first and second sets of belt segments being driven to move in opposite directions and being alternated with each other in a direction transverse to their direction of motion to thereby define oppositely-directed channels for product flow,
  (2) deflection fingers positioned adjacent one end of each belt segment in one of said sets for deflecting containers from the belt segments of said set to the belt segments of the other set to thereby define a preferred flow direction, and
  (3) means for destacking containers stacked on top of each other on said segments whereby said containers are constrained to move in said channels in a single layer,
 (B) means for receiving a supply of tightly stacked trays, separating said trays one by one and placing said trays onto a conveyor;
 (C) means for conveying said unscrambled containers in flights of a desired quantity and loading said containers into said trays,
 (D) means for synchronizing the movement of said trays and said container flights so that said trays are always available and properly advanced for loading; and
 (E) means for advancing and stacking the filled trays.

2. An automatic traying apparatus for filling trays with containers, said apparatus comprising:
 (A) means for receiving a quantity of containers and unscrambling said containers so that only a single layer of containers in an upright position may exit from said receiving and unscrambling means, said receiving and unscrambling means including:
  (1) a moving surface upon which said containers are deposited,
  (2) a member extending transverse to the direction of movement of said surface at a height above said surface greater than the height of a single upright container, but less than twice the height of a single upright container whereby said member eliminates stacking of said containers as they are advanced, and
  (3) means for sensing whether a container is upside-down and removing upside-down containers from the product flow,
 (B) means for receiving a supply of tightly-stacked trays, separating said trays one-by-one, placing said trays onto a conveyor and advancing said trays only if a flight of containers is available for loading into said trays,
- (C) means for conveying said unscrambled containers in flights of a desired quantity and loading said containers into said trays, said loading means including a conveyor having a plurality of spaced-apart, outwardly-extending fingers attached thereto, said conveyor traveling through a path having a relatively flat portion intermediate to arcuate portions, the outer edges of said fingers being extended apart on said conveyor while traveling through said arcuate portions to accept or release said containers between adjacent pairs of said fingers and being brought together on said conveyor while traveling through said relatively flat portion to carry said containers between said pairs of adjacent fingers while traveling through said relatively flat portions,
- (D) means for synchronizing the movement of said trays and said container flights so that said trays are always available and properly advanced for loading, and
- (E) means for advancing and stacking the filled trays.

3. The automatic traying apparatus of claim 2 wherein said stacking means includes means for elevating the stack of filled trays so that each newly filled advancing tray is moved into position at the bottom of the stack.

4. The automatic traying apparatus of claim 3 wherein said elevating means includes a pair of opposed supporting members with tray lifting brackets mounted thereon, said supporting members being secured to and driven in counter rotation by a pair of counter rotating gears.

5. The automatic traying apparatus of claim 2 in which the means for sensing whether a container is upside-down and for removing said container from the product flow includes a member having at least one channel for receiving containers therein, said member having a leading edge positioned adjacent said moving surface and configured to have the upper edges of upright containers flow onto said leading edge to thereby carry said container into said channel, said upside-down containers passing below said leading edge into a receptacle therefor removed from said product flow.

6. The automatic traying apparatus of claim 2 wherein said tray separating means includes:
- (A) means for sensing the junction between the end tray on the stack and the next adjacent tray,
- (B) means for driving a spiking blade into said junction to initiate separation of said end tray from said stack, and
- (C) means for completely removing said end tray from said stack and placing it on said conveyor.

7. The automatic traying apparatus of claim 2 including container orienting means comprising:
- (A) an inclined channel into which said containers are fed, and
- (B) a moving belt off center with respect to, but contacting the bottoms of said containers, said belt moving in the direction of said container at a more rapid rate than said containers, thereby imparting a rotary movement to said containers to orient them to a predetermined position.

8. The automatic traying apparatus of claim 2 wherein said means for separating said stack trays includes:
- (A) means for sensing the junction between the end tray on the stack and the next adjacent tray,
- (B) means for driving a spiking blade into said junction to initiate separation of said end tray from said tray, and
- (C) means for completely removing said end tray from said stack and placing it on a conveyor.

9. An automatic traying apparatus for filling trays with containers, said apparatus comprising:
- (A) means for receiving a quantity of containers and unscrambling said containers so that only a single layer of containers in an upright position may exit from said receiving and unscrambling means;
- (B) means for receiving a supply of tightly-stacked trays, separating said trays one by one, and placing said trays onto a conveyor;
- (C) means for orienting said containers before loading said containers into said trays, said orienting means including
  - (1) a channel into which said containers are fed,
  - (2) a moving belt off center with respect to but contacting the bottoms of said containers, said belt moving in the direction of said containers at a more rapid rate than said containers move in said channel, thereby imparting a rotary movement to said containers to orient them to a predetermined position;
- (D) means for conveying said unscrambled containers in flights of a desired quantity and loading said containers into said trays, said loading means including a conveyor having a plurality of spaced-apart, outwardly-extending fingers attached thereto, said conveyor traveling through a path having a relatively flat portion intermediate to arcuate positions, the outer edges of said fingers being extended apart on said conveyor while traveling through said arcuate portions to accept or release said containers between adjacent pairs of said fingers and being brought together on said conveyor while traveling through said relatively flat portion to carry said containers between said pairs of adjacent fingers while traveling through said relatively flat portions;
- (E) means for synchronizing the movement of said trays and said container flights so that said trays are always available and properly advanced for loading; and
- (F) means for advancing and stacking the filled trays, said stacking means including means for elevating the stack of filled trays so that each newly filled advancing tray is moved into position at the bottom of the stack.

10. An automatic traying apparatus for filling trays with containers, said apparatus comprising:
- (A) means for receiving a quantity of containers and unscrambling said containers so that only a single layer of containers in an upright position may exit from said receiving and unscrambling means;
- (B) means for receiving a supply of tightly-stacked trays, separating said trays one-by-one, and placing said trays onto a conveyor;
- (C) means for conveying said unscrambled containers in flights of a desired quantity and loading said containers into said trays, said loading means including a conveyor having a plurality of spaced-apart, outwardly-extending fingers attached thereto, said conveyor traveling through a path having a relatively flat portion intermediate to arcuate portions, the outer edges of said fingers being extended apart on said conveyor while traveling through said arcuate portions to accept or release said containers between adjacent pairs of said fingers and being brought together on said conveyor while traveling through said relatively flat portion to carry said containers between said pairs of adjacent fingers while traveling through said relatively flat portions;
- (D) means for synchronizing the movement of said trays and said container flights so that said trays are always available and properly advanced for loading, said synchronizing and advancing means including means for advancing said trays only if a flight of containers is available and loading said containers only if a tray is properly advanced and available;

(E) means for advancing and stacking the filled trays, said stacking means including means for elevating the stack of filled trays so that each newly filled advancing tray is moved into position at the bottom of the stack and said elevating means including a pair of opposed supporting members with tray lifting brackets mounted thereon, said supporting members being secured to and driven in counter rotation by a pair of counter rotating gears.

11. An automatic traying apparatus for filling trays with containers, said apparatus comprising:

(A) means for receiving a quantity of containers and unscrambling said containers so that only a single layer of containers in an upright position may exit from said receiving and unscrambling means, said receiving and unscrambling means including;

(1) first and second sets of belt segments for receiving said containers, said first and second sets of belt segments being driven to move in opposite directions and being alternated with each other in a direction transverse to their direction of motion to thereby define oppositely directed channels for product flow, (2) deflection fingers positioned adjacent one end of each belt segment in one of said sets for deflecting containers from the belt segments of said set to the belt segments of the other set to thereby define a preferred flow direction, and (3) means for destacking containers stacked on top of each other and on said segments whereby said containers are constrained to move in said channels in a single layer;

(B) means for receiving a supply of tightly stacked trays, separating said trays one by one and placing said trays onto a conveyor;

(C) means for conveying said unscrambled containers in flights of a desired quantity and loading said containers into said trays, said loading means including a conveyor having a plurality of spaced-apart, outwardly-extending fingers attached thereto, said conveyor traveling through a path having a relatively flat portion intermediate to arcuate portions, the outer edges of said fingers being extended apart on said conveyor while traveling through said arcuate portions to accept or release said containers between adjacent pairs of said fingers and being brought together on said conveyor while traveling through said relatively flat portion to carry said containers between said pairs of adjacent fingers while traveling through said relatively flat portions;

(D) means for synchronizing the movement of said trays and said container flights so that said trays are always available and properly advanced for loading; and (E) means for advancing and stacking the filled trays.

References Cited

UNITED STATES PATENTS

| | | | |
|---|---|---|---|
| 2,699,278 | 1/1955 | Wysocki | 53—160 |
| 2,953,240 | 9/1960 | Nigrelli et al. | 198—179 |
| 2,978,854 | 4/1961 | Fairest | 53—166X |
| 3,273,306 | 9/1966 | Maclennan | 53—55X |
| 3,314,212 | 4/1967 | Peppler | 53—160X |
| 3,314,213 | 4/1967 | Peppler | 53—246X |
| 3,342,012 | 9/1967 | Reading | 53—160X |

THERON E. CONDON, Primary Examiner

R. L. SPRUILL, Assistant Examiner

U.S. Cl. X.R.

53—160, 246, 251